(12) United States Patent
Batekhin (10) Patent No.: US 10,041,208 B1
(45) Date of Patent: Aug. 7, 2018

(54) TEXTILE FABRICATION SYSTEM

(71) Applicant: Leonid Batekhin, New York, NY (US)

(72) Inventor: Leonid Batekhin, New York, NY (US)

(*) Notice: Subject to any disclaimer, the term of this patent is extended or adjusted under 35 U.S.C. 154(b) by 451 days.

(21) Appl. No.: 14/867,233

(22) Filed: Sep. 28, 2015

(51) Int. Cl.
| | |
|---|---|
| *D06Q 1/00* | (2006.01) |
| *B32B 5/00* | (2006.01) |
| *B32B 7/00* | (2006.01) |
| *B32B 15/00* | (2006.01) |
| *B65H 49/00* | (2006.01) |
| *B65H 54/00* | (2006.01) |
| *D06M 17/00* | (2006.01) |
| *D06Q 1/04* | (2006.01) |
| *B32B 5/02* | (2006.01) |
| *B32B 5/12* | (2006.01) |
| *B32B 15/14* | (2006.01) |
| *B32B 7/12* | (2006.01) |
| *B32B 5/26* | (2006.01) |

(52) U.S. Cl.
CPC .............. *D06Q 1/04* (2013.01); *B32B 5/022* (2013.01); *B32B 5/12* (2013.01); *B32B 5/26* (2013.01); *B32B 7/12* (2013.01); *B32B 15/14* (2013.01); *B65H 49/00* (2013.01); *B65H 54/00* (2013.01); *D06M 17/00* (2013.01); *D10B 2401/20* (2013.01); *D10B 2501/00* (2013.01)

(58) Field of Classification Search
CPC ... D06Q 1/00; D06Q 1/04; B32B 5/00; B32B 5/02; B32B 5/022; B32B 5/10; B32B 5/12; B32B 5/20; B32B 5/26; B32B 7/00; B32B 7/10; B32B 7/12; B32B 15/00; B32B 15/14; B32B 15/10; B65H 49/00; B65H 54/00; D06M 17/00
See application file for complete search history.

(56) References Cited

U.S. PATENT DOCUMENTS

| | | | |
|---|---|---|---|
| 4,243,713 A | 1/1981 | Worrall et al. | |
| 5,201,169 A * | 4/1993 | Miyashita | D02G 3/12 57/295 |
| 7,069,714 B2 | 7/2006 | De Boni | |
| 7,491,665 B2 * | 2/2009 | Nangla | A41D 31/00 442/182 |
| 2007/0028991 A1 | 2/2007 | Cavender | |

FOREIGN PATENT DOCUMENTS

| | | |
|---|---|---|
| WO | WO9113196 | 9/1991 |
| WO | WO03106763 | 12/2003 |
| WO | WO2013074539 | 5/2013 |

* cited by examiner

*Primary Examiner* — Seyed Masoud Malekzadeh
*Assistant Examiner* — Matthew Hoover
(74) *Attorney, Agent, or Firm* — Goldstein Law Offices, P.C.

(57) ABSTRACT

A textile fabrication system for creating a textile panel having a glistening multicolor appearance, using a foil panel, thread, a board, and a backer panel. The board has a first edge, second edge, a front, and a rear. The thread is wound repeatedly on the board across the front from the first edge to second edge, and across the rear to create a threaded area. The foil panel is adhered to the thread in the threaded area on the front, and then is unwound onto a spool, fragmenting the foil as it remains adhered to the thread. The coated thread may be rewound onto the front of the board, and then attached to a backer panel to create a textile panel. The coated threads are cut along the first edge and the textile panel is removed from the board for use in a garment.

12 Claims, 12 Drawing Sheets

TEXTILE FABRICATION SYSTEM

TECHNICAL FIELD

The present disclosure relates generally to a textile fabrication system. More particularly, the present disclosure relates to a system for applying a foil to textile thread and subsequent use of the thread to create a textile panel that has a unique appearance.

BACKGROUND

Advances in fashion design involves not only crafting garments into new shapes and new configurations, but also the incorporation of new and innovative materials into fashion designs.

New materials are constantly being developed. Although many of these materials have a very interesting appearance, they often are not manageable and thus impractical for the creation of garments.

To provide a metallic appearance on a garment, foil sheets are sometimes attached to already woven panels of fabric and used in garments. The result is a uniform metallic appearance that can be rather harsh. Little can be done, however, to lessen the impact of the solid metallic surface. Accordingly, this type of metallic coating is likely to be only used in the most avant-garde of fashion designs.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant in an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system for creating textiles having a multicolored, glistening appearance. Accordingly, the present disclosure provides a system for coating thread with foil which can be subsequently used to create a textile panel where the foil selectively appears to create a glistening, interesting and aesthetically pleasing appearance.

It is another aspect of an example embodiment in the present disclosure to provide a system which allows the creation of garments that have the glistening appearance of metallic foils, yet are feasible to manufacture. Accordingly, the present disclosure effectively produces thread that is coated with metallic foil and may be embodied in a textile panel that is adhered to a backer panel. The backer panel is preferably made of a fabric material that is easy to work with and may be attached to other fabric materials for the creation of a garment.

Accordingly, the present disclosure describes a textile fabrication system for creating a textile panel having a glistening multicolor appearance, using a foil panel, thread, a board, and a backer panel. The thread is wound repeatedly on the board across the front from the first edge to second edge, and across the rear to create a threaded area. The foil panel is adhered to the thread in the threaded area on the front and then is unwound onto a spool, fragmenting the foil as it remains adhered to the thread. The coated thread may be rewound onto the front of the board from the first edge to second edge and across the rear, and then attached to a backer panel to create a textile panel. The coated threads are cut along the first edge and the textile panel is removed from the board for use in a garment.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
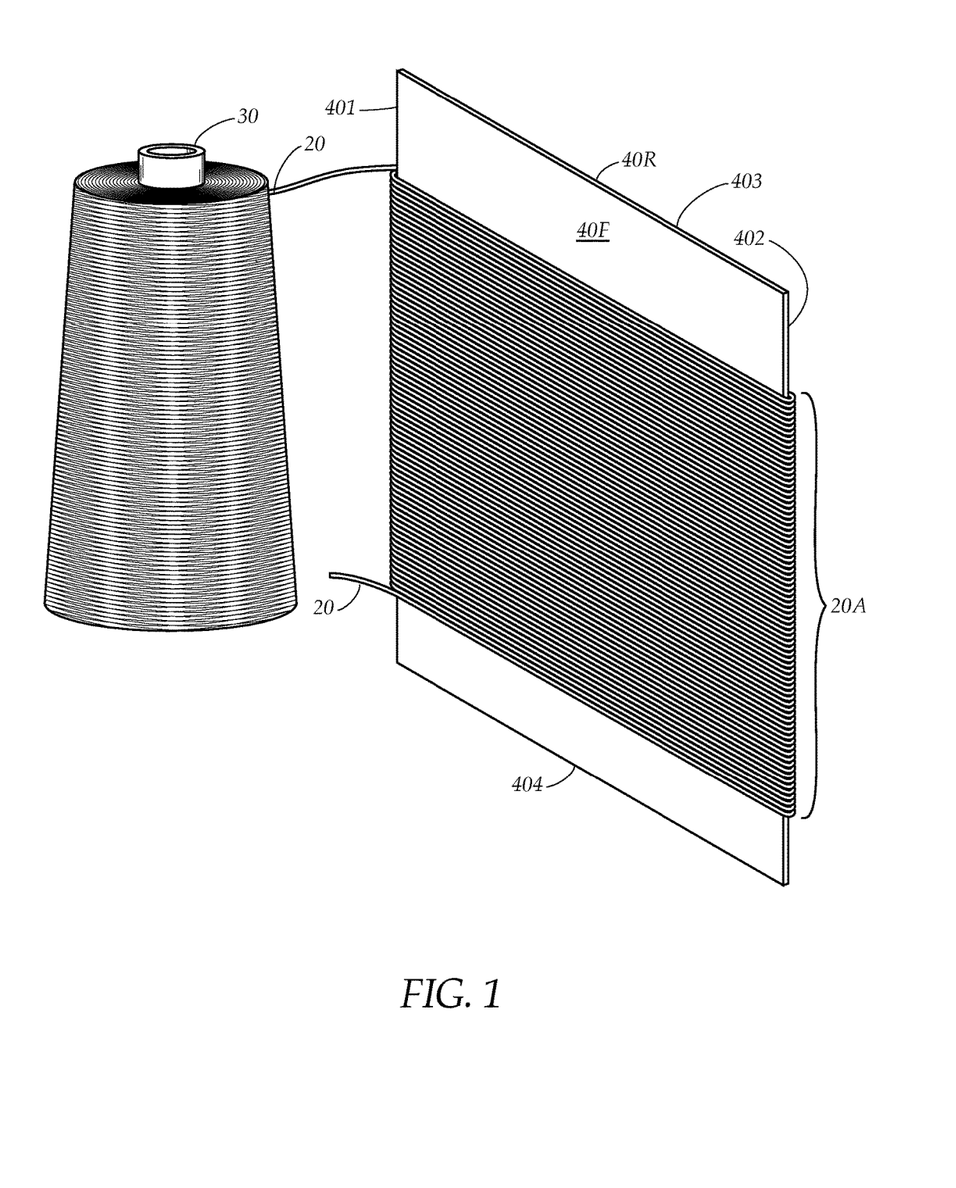
FIG. 1 is diagrammatic perspective view, showing a thread being unwound from a spool and simultaneously wound around a board.

FIG. 1 illustrates a thread 20, initially wound on a spool 30. The thread may be of any length and thickness suitable for fulfilling the purposes described hereinbelow. As illustrated, the thread is being unwound from the spool 30, and wound upon a board 40. The board 40 has a front 40F and a rear 40R. The board also has a first edge 401, a second edge 402, a third edge 403, and a fourth edge 404. The first edge 401 and second edge 402 are substantially parallel to each other and are fully opposite of each other on the board 40. The third edge 403 and fourth edge 404 are parallel to each other, and perpendicular to the first edge 401 and second edge 402, such that the third edge 403 and fourth edge 404 each extend between the first edge 401 and second edge 402. The thread 20 is wound on the board by repeatedly creating a winding on the board. In particular, each winding involves extending the thread from the first edge 401, across the front 40F to the second edge 402, over the second edge 402 to the rear 40R, across the rear 40R to the first edge 401, and over the first edge 401 to the front 40F. In particular, the winding begins near the third edge 403, with each winding moving progressively closer to the fourth edge 404. Each winding is parallel to the next and moves closer to the fourth edge 404 by approximately the thickness of the thread, such that a significant region of the board 40 is covered by the windings, and defines a threaded area 20A thereupon. The threaded area 20A actually extends on both the front 40F and the rear 40R.

Figure 2:
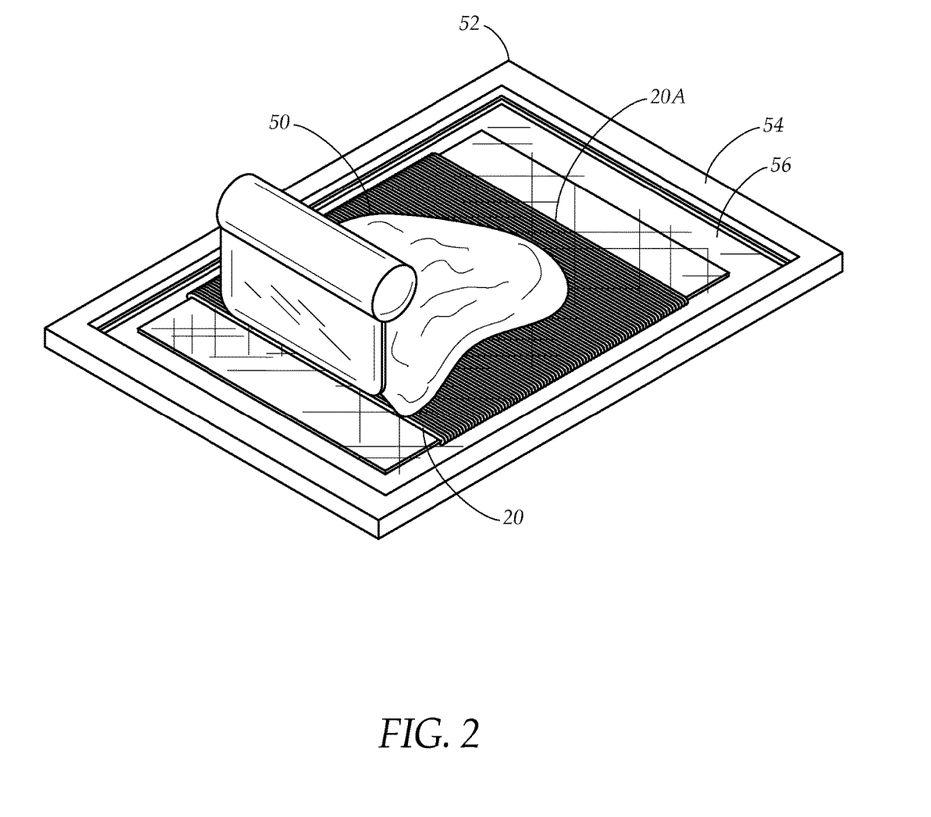
FIG. 2 is a diagrammatic perspective view, showing glue being applied to the thread on the board through a silk screen.

Referring to FIG. 2, once the threaded area 20A is a desired size, having a desired number or amount of windings, glue 50 is applied to the threaded area 20A. In particular, a silk screen 52 is employed, the silk screen 52 including a frame 54 and a screen element 56. The screen element 56 is positioned over the board 40 against the thread 20, covering the threaded area 20A. The glue 50 is then spread upon the screen element 56, the screen element 56 having numerous minute openings that facilitate an even coating of glue 50 on the threaded area 20A.

Figure 3:
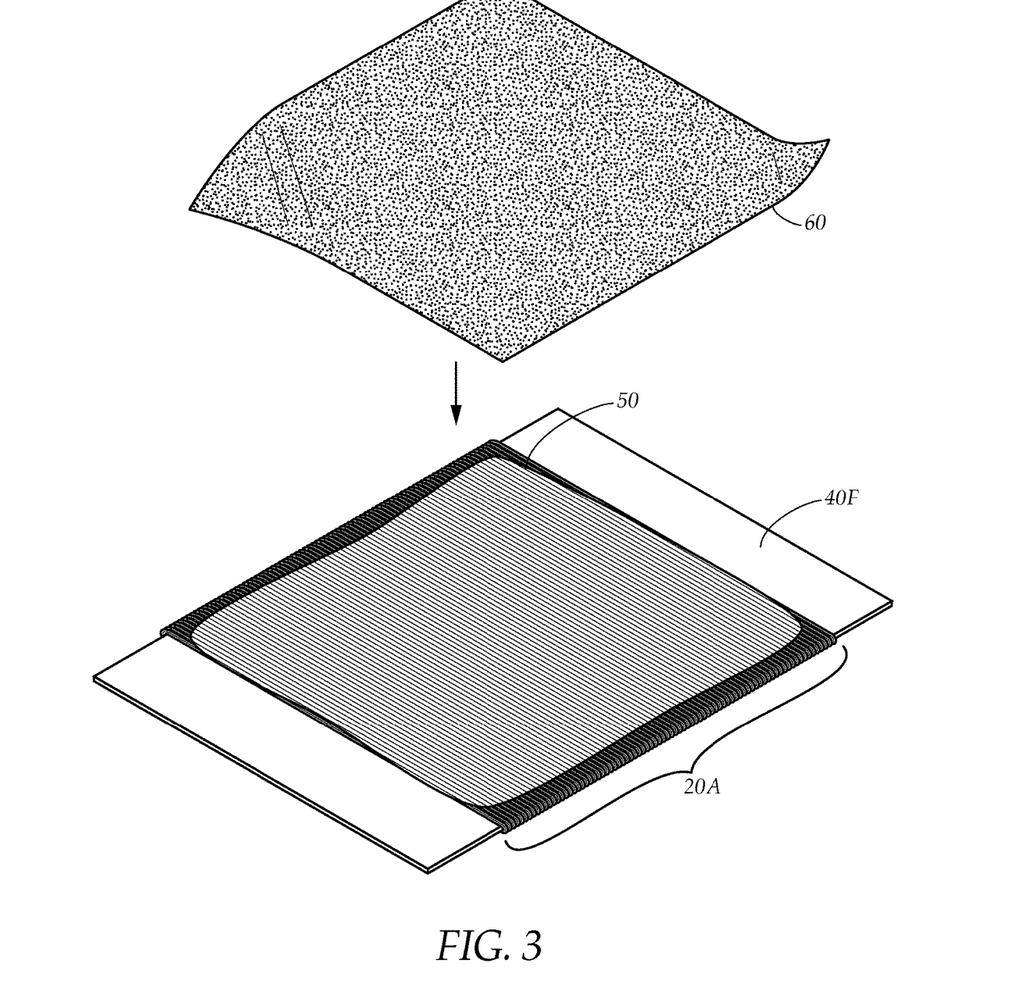
FIG. 3 is a diagrammatic perspective view, showing a foil sheet being applied onto the thread, and adhered thereto with the glue.

FIG. 3 illustrates the threaded area 20 covered with glue 50, such that portions of the thread 20 that face away from the front 40F of the board 40 are coated with glue 50. Also illustrated is a foil sheet 60. The foil sheet is a thin layer of a metallic or metallic-like material, that has reflective properties inherent in metallic materials. The foil sheet 60 can be any color, can contain varying or multiple colors, or may even be made of of multiple foil sheets, perhaps of different colors, positioned adjacent to each other. The foil sheet 60 is positioned over the threaded area 20A, and adhered to the glue 50 thereupon.

Figure 4:
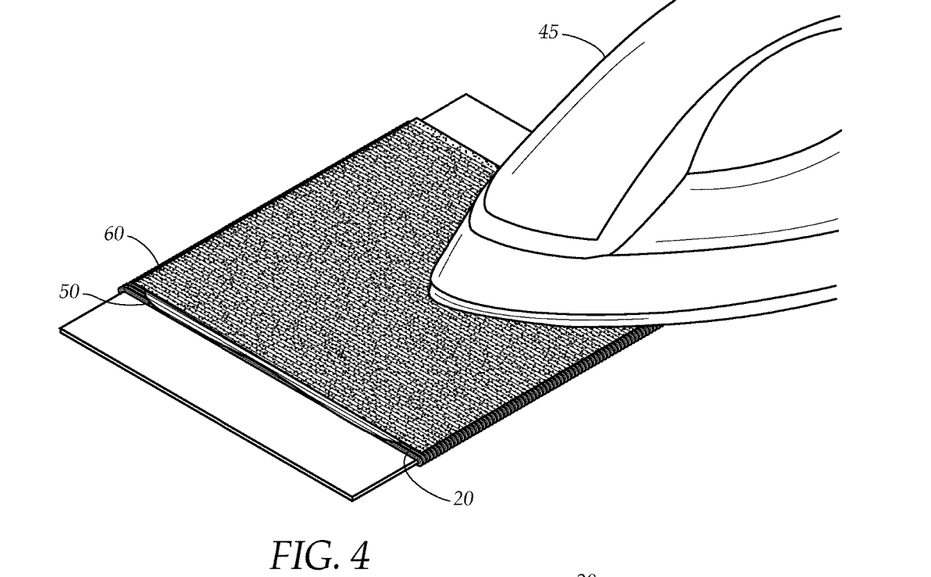
FIG. 4 is a diagrammatic perspective view, illustrating the application of heat to dry the glue and secure the foil to the thread.
Figure 4A:
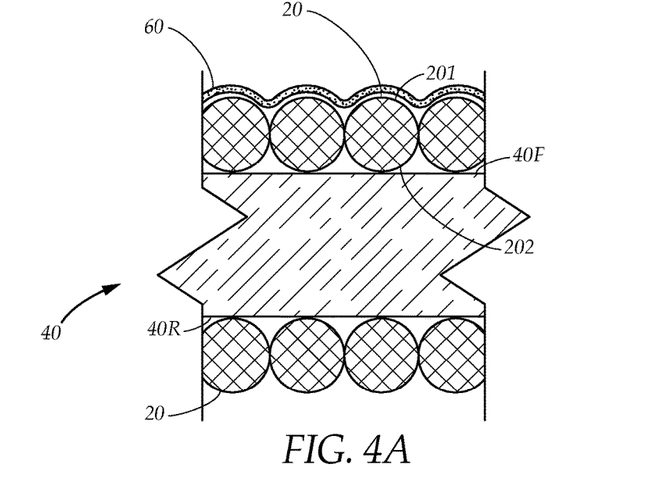
FIG. 4A is a cross sectional view with parts broken away, detailing the foil adhering to outward portions of the thread.

Referring to FIG. 4, the glue 50 is dried to secure the foil sheet 60 to the thread 20. Drying may be facilitated by the application of heat, such as by using an iron 45. Referring to FIG. 4A, the foil 60 is adhered to thread 20 as it extends across the front 40F of the board 40, but not to thread 20 as it extends across the rear 40R of the board. In addition, the foil 60 is substantially adhered to outward portions 201 of the thread facing away from the front of the board 40F, but is not adhered to inward portions 202 of the thread facing toward the front of the board 40F. Note that in other embodiments, the steps indicated in FIG. 3 and FIG. 4 may be repeated, such that foil sheets 60 are also adhered to thread 20 extending across rear 40R of the board. Accordingly, different colored foils may be used on the front 40F and rear 40R to provide interesting results.

Figure 5:
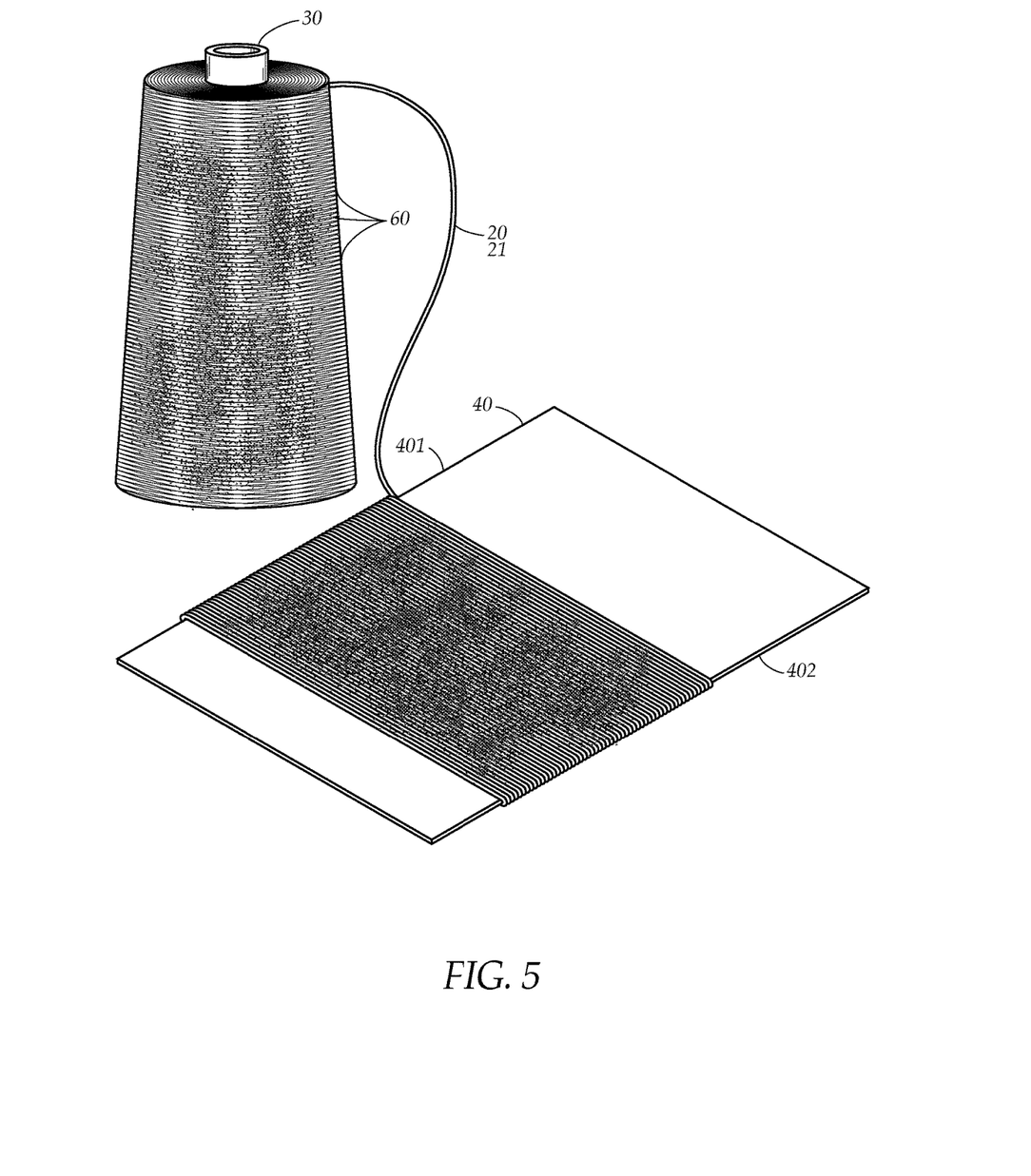
FIG. 5 is a diagrammatic perspective view, showing the thread being unwound from the board, and rewound on the spool, the foil having created a pattern on the thread.
Figure 6:
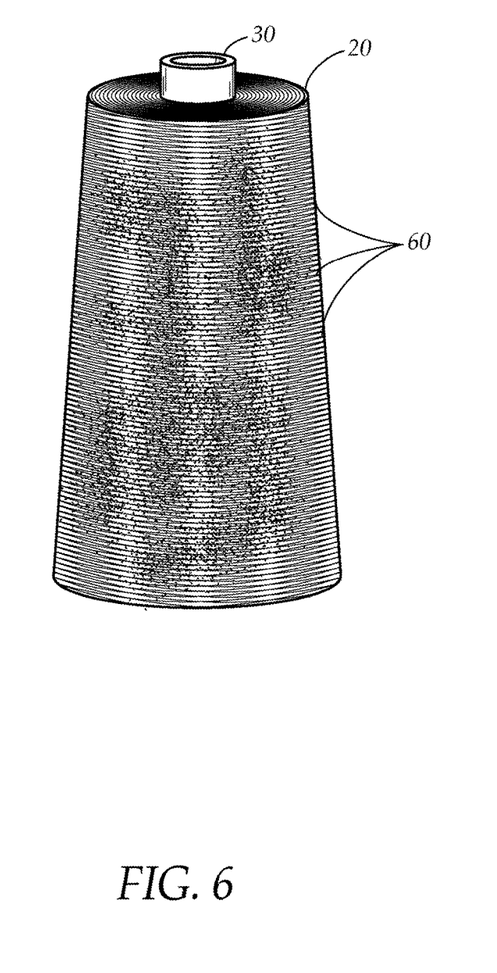
FIG. 6 is a diagrammatic perspective view, illustrating the spool, containing the thread which is partially coated with the foil.

Once the glue is sufficiently dried, referring to FIG. 5 the thread 20 is unwound from the board 40. The unwinding of the thread 20 essentially shreds and fragments the foil 60 which remains adhered to the thread 20, creating coated thread 21, or "irregularly foiled" thread. This irregular foiling is readily observable as the foil 60 is present in minute strips that are more or less the width of the coated thread 21, and are only on one "side" of the thread 21, and are not present on portions which were at the first edge 401 and second edge of the board 402, or uncoated portions, such as portions which extended across the rear 40R of the board (referring momentarily to FIG. 4) if thread extending across the rear 40R of the board is not also foiled. As the coated thread 21 is unwound onto the spool 30, the thread will naturally twist, and so patterns of irregular foiling of the glistening foil will be observable, where regions of the thread are seen coated, such as the outward portions 401 seen in FIG. 6 with foil 60 while other regions are uncoated. Once fully wound onto the spool 30 as shown in FIG. 6, the coated thread 21 with its irregular foiling may be used in various processes, both presently available and prospectively created, for manufacturing fabric from thread.

Figure 7:
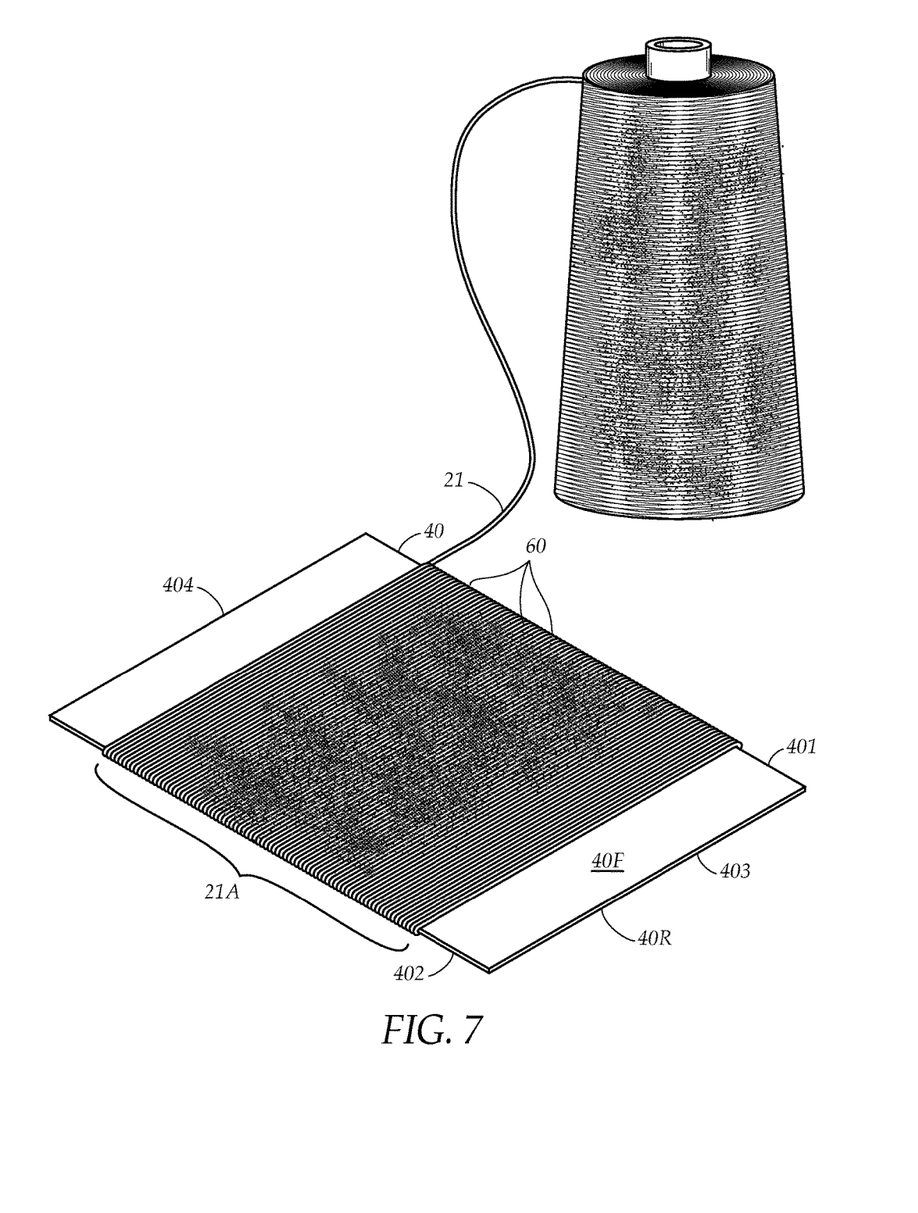
FIG. 7 is a diagrammatic perspective view, illustrating the thread being rewound onto the board, the foil creating an intermittent pattern on the thread as it is wound onto the board.

FIG. 7 illustrates an initial step in creating a textile panel 80 (FIG. 12) from the coated thread 21, in accordance with the principles of the present disclosure. In particular, the coated thread 21 is wound around the board 40. Note that this board may be the same board and have the same dimensions as employed in creating the coated thread as previously described (FIG. 1-6), or may be different dimensions. For simplicity, the same board 40, with the same nomenclature and reference numerals is employed in the following discussion.

Note that as the coated thread 21 is wound around the board 40, and the linear thread is again transposed into a three dimensional coiling of thread on the board 40, the foil 60 will create new and unexpected glistening patterns with a multicolor effect, as different tensions of the thread, twisting of the thread, and offsetting of uncoated regions shifts around the board. In particular, each winding involves extending the coated thread 21 from the first edge 401, across the front 40F to the second edge 402, over the second edge 402 to the rear 40R, across the rear 40R to the first edge 401, and the over the first edge 401 to the front 40F. In particular, the winding begins near the third edge 403, with each winding moving progressively closer to the fourth edge 404. Each winding is parallel to the next and moves closer to the fourth edge 404 by approximately the thickness of the thread, such that a significant region of the board 40 is covered by the windings, and defines a coated threaded area 21A thereupon. The coated threaded area 21A extends on both the front 40F and the rear 40R, and the visible pattern created by the foil 60 is visible on both the front 40F and rear 40R of the board.

Figure 8:
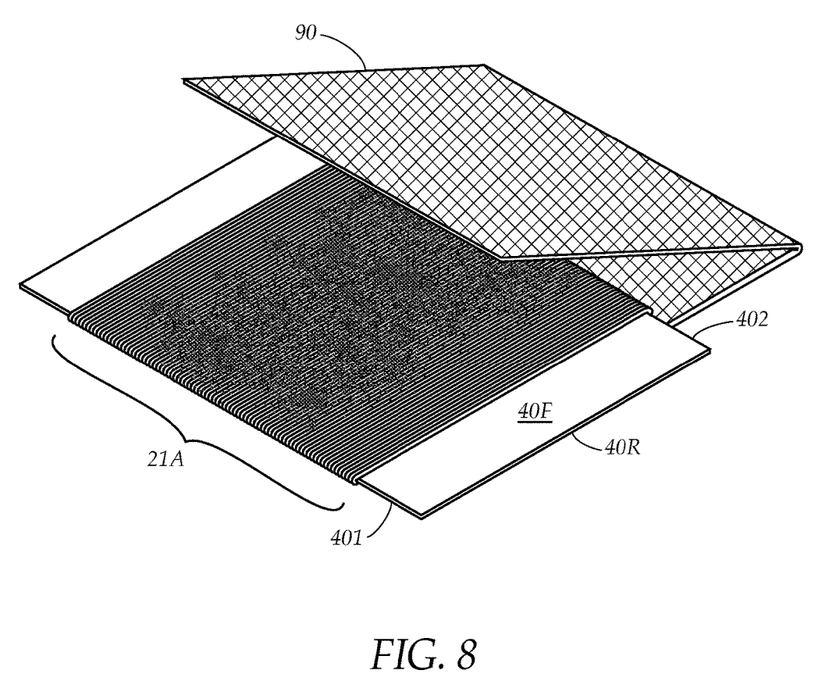
FIG. 8 is a diagrammatic perspective view, illustrating a backer panel being applied to both sides of the board.
Figure 11:
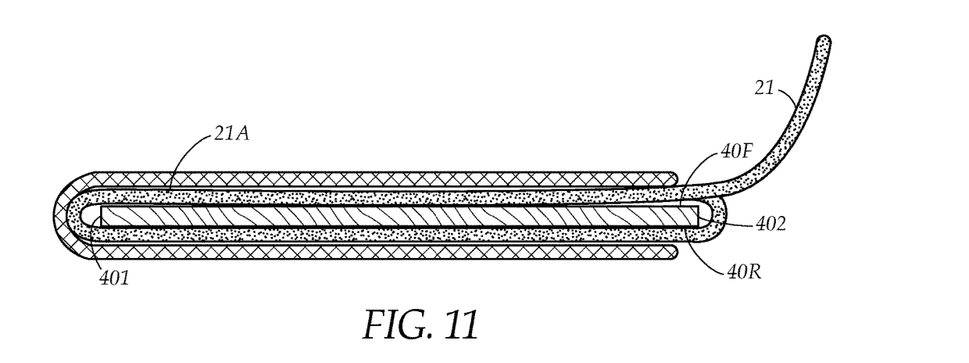
FIG. 11 is a side elevational view, illustrating the thread on the board, with the backer sheet adhered thereto.

Referring then to FIG. 8 and FIG. 11, a backer panel 90 is introduced to the coated threaded area 21A. The backer panel 90 may be any suitable fabric material that can provide adequate support for the threaded area 21A and can be sewn or otherwise attached to other textile panels or fabric for creating a garment. Such suitable materials for the backer panel 90 may include fusible interfacing, or any woven or knitted fabric that has an adhesive that can adhere to the threads with application of heat and would not be destroyed with the application of heat. Such fabric may include silk, wool, cotton, polyester, acetate, rayon, fabric blends, and the like. The backer panel 90 is extended longitudinally in the direction of the coated thread windings. In particular, the backer panel 90 extends over the coated threaded area 21A to span from the first edge 401 of the front 40F toward the second edge 402, folded over the second edge 402, and then extended over the rear 40R from the second edge 402 toward the first edge 401. Accordingly, longitudinally the backer panel 90 has a length that is at least twice the distance between the first edge 401 and second edge 402. The backer panel 90 is also preferably wider than the threaded area 21A.

Figure 9:
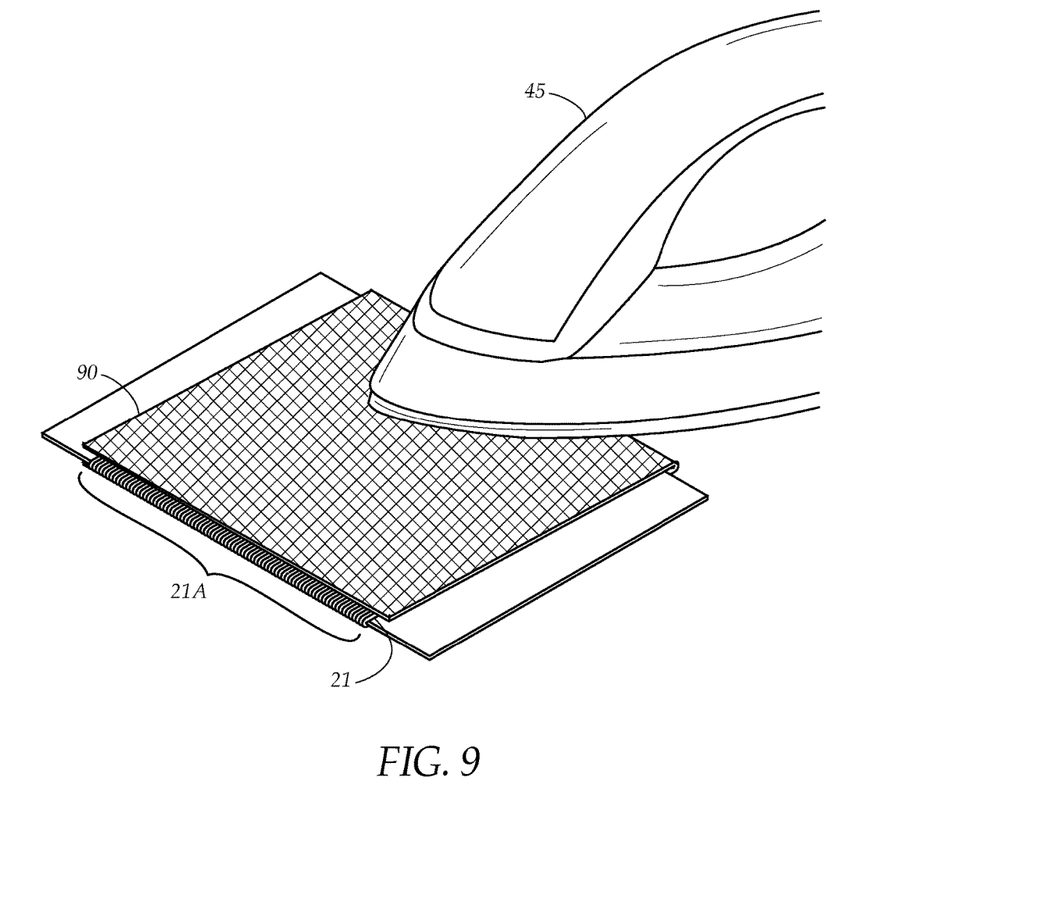
FIG. 9 is a diagrammatic perspective view, illustrating heat being used to secure the backer panel to the thread.

Referring to FIG. 9, the backer panel 90 has an adhesive, either inherently or applied just prior to use, and is thereby adhered to the coated threads 21 in the coated threaded area 21. The iron 45 may be used to introduce heat to facilitate the backer panel 90 adhering to the coated threaded area 21A. Note that depending on the material employed as the backer panel 90, other means may be provided to adhere the backer panel 90 to the coated threads 21.

Figure 10:
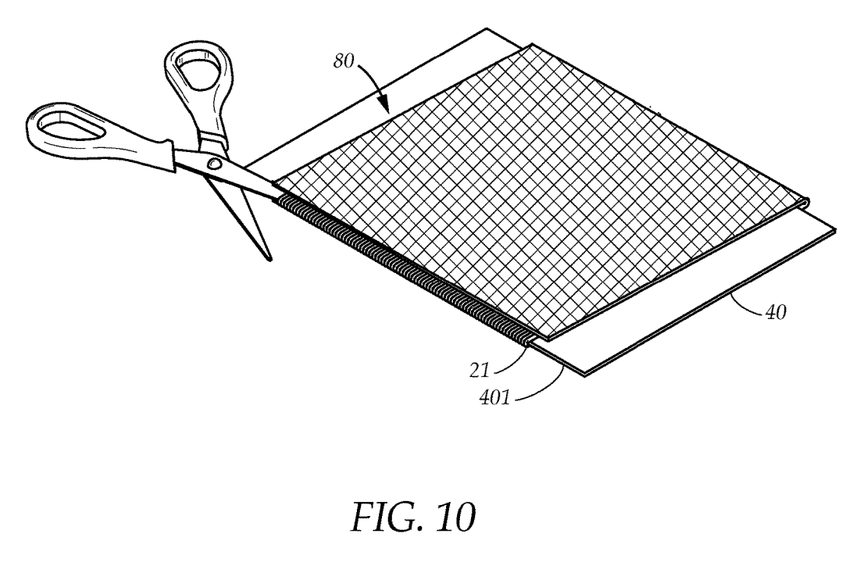
FIG. 10 is a diagrammatic perspective view, illustrating the thread being cut along one edge to free the textile panel from the board.
Figure 12:
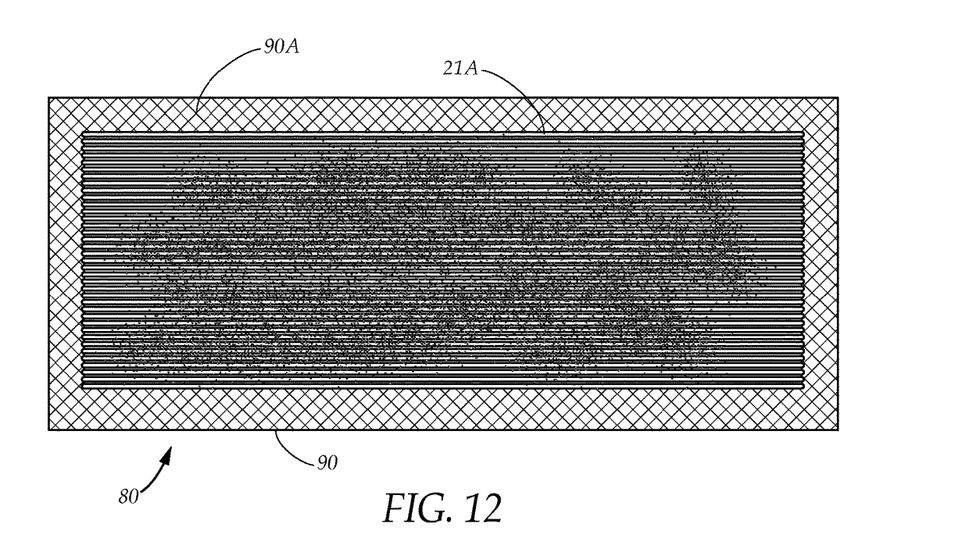
FIG. 12 illustrates the textile panel, laid flat, the backer panel providing a boarder region around the threaded area.
Figure 13:
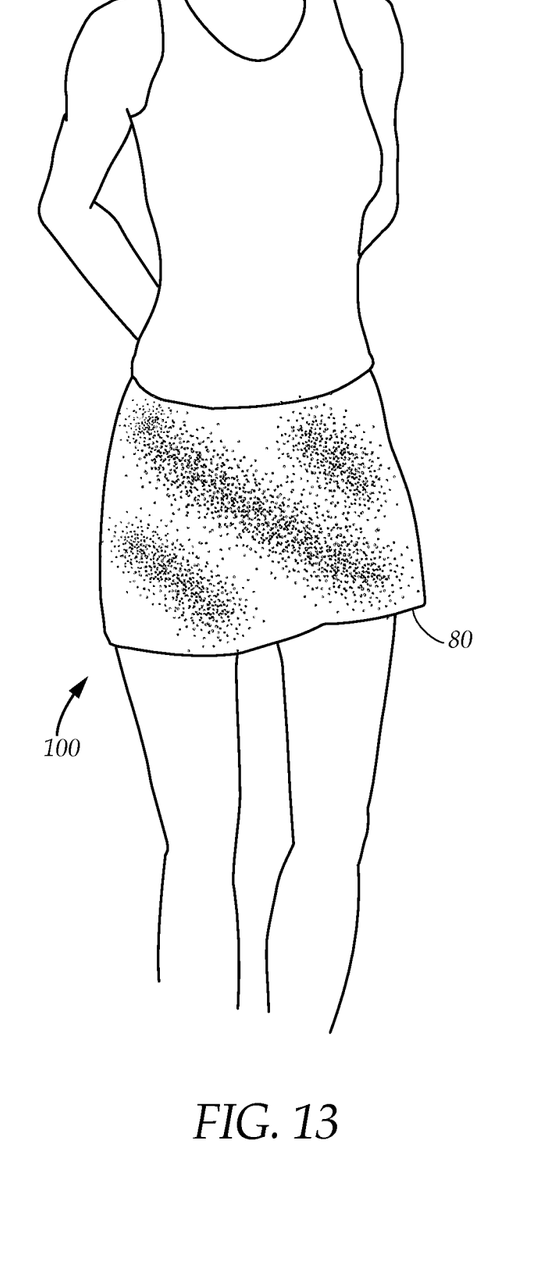
FIG. 13 illustrates a garment, created with the textile panel.

Referring to FIG. 10, the coated threads 21 are cut along the first edge 401 of the board 40, freeing the textile panel 80 from the board 40. Referring to FIG. 12, the textile panel 80 has been laid flat, and is ready to use. Preferably, the backer panel 90 provides a border region 90A around the coated threaded area 21A to facilitate attachment to other similar textile panels 80 or other fabric, for creating a garment 100 as seen in FIG. 13. Note that the garment 100 provides a distinctive, glistening multicolored appearance due to the scattering and offsetting of the foil 60 through the process described hereinabove.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a textile fabrication system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A textile creation method, using a foil sheet, thread, and a board having a front side, a rear side, a first edge, and a second edge, comprising the steps of:
   creating a threaded area on the board having a plurality of parallel windings of the thread by winding the thread around the board, wherein the thread repeatedly extends across the front side from the first edge to the second edge and across the rear side from the second edge to the first edge;
   coating the thread with the foil sheet by applying and adhering the foil sheet to the threaded area; and
   fragmenting the foil sheet by unwinding the coated thread from the board and onto a spool.

2. The textile fabrication method as recited in claim 1, wherein the step of adhering the foil sheet to the thread further comprises applying glue to the threads in the threaded area on the front side of the board and positioning the foil sheet against the glue, and wherein the foil sheet is substantially adhered to portions of the thread facing away from the front side of the board, but not adhered to portions of the thread facing toward the front side of the board.

3. The textile fabrication method as recited in claim 2, wherein the step of applying glue to the threads further comprises distributing glue onto the portions of the thread facing away from the front side by positioning a silk screen over the thread and spreading glue onto the thread through a silkscreen.

4. The textile fabrication method as recited in claim 3, wherein the step of unwinding the coated thread onto a spool is preceded by the step of drying the glue that adheres the thread to the foil sheet.

5. The textile fabrication method as recited in claim 4, wherein the steps as recited are followed by the step of creating a textile panel by:
   rewinding the thread onto the board from the spool wherein the thread repeatedly extends across the front from the first edge to the second edge and across the rear side from the second edge to the first edge,
   adhering a backer sheet onto the thread by extending the backer sheet across the front side from the first edge to the second edge, holding the backer sheet over the second edge to the rear side, and then extending the backer sheet across the rear side from the second edge to the first edge;

cutting the threads along the first edge; and removing the textile panel from the board by unfolding the backer sheet at the second edge.

6. The textile fabrication method as recited in claim 5, wherein the step of adhering a backer sheet onto the thread further comprises applying heat to the backer sheet.

7. The textile fabrication method as recited in claim 6, further comprising the step of creating a garment by joining the textile panel to other fabric panels.

8. A textile fabrication method, using a foil sheet, thread, and a board having a front side, a rear side, a first edge, and a second edge, comprising the steps of:

creating a threaded area on the board having a plurality of parallel windings of the thread by winding the thread around the board, wherein the thread repeatedly extends across the front side from the first edge to the second edge and across the rear side from the second edge to the first edge;

coating the thread with the foil sheet by applying and adhering the foil sheet to the threaded area;

fragmenting the foil sheet as it remains adhered to the thread by unwinding the coated thread from the board and onto a spool;

rewinding the thread onto the board from the spool wherein the thread repeatedly extends across the front side from the first edge to the second edge and across the rear side from the second edge to the first edge, adhering a backer sheet onto the thread by extending the backer sheet across the front side from the first edge to the second edge, holding the backer sheet over the second edge to the rear side, and then extending the backer sheet across the rear side from the second edge to the first edge;

cutting the threads along the first edge; and removing the textile panel from the board by unfolding the backer sheet at the second edge.

9. The textile fabrication method as recited in claim 6, wherein the step of adhering the foil sheet to the thread further comprises applying glue to the threads in the threaded area on the front of the board and positioning the foil sheet against the glue, and wherein the foil sheet is substantially adhered to portions of the thread facing away from the front side of the board, but not adhered to portions of the thread facing toward the front side of the board.

10. The textile fabrication method as recited in claim 9, wherein the step of applying glue to the threads further comprises distributing glue onto the portions of the thread facing away from the front side by positioning a silk screen over the thread and spreading glue onto the thread through a silkscreen.

11. The textile fabrication method as recited in claim 10, wherein the step of unwinding the coated thread onto a spool is preceded by the step of drying the glue that adheres the thread to the foil sheet.

12. The textile fabrication method as recited in claim 11, further comprising the step of creating a garment by joining the textile panel to other fabric panels.

* * * * *